(12) United States Patent
Cheng et al.

(10) Patent No.: US 11,434,334 B2
(45) Date of Patent: Sep. 6, 2022

(54) COMPOSITE MATERIAL AND FOAM PREPARED FROM THE SAME

(71) Applicant: INDUSTRIAL TECHNOLOGY RESEARCH INSTITUTE, Hsinchu (TW)

(72) Inventors: Shun Wen Cheng, Tainan (TW); Sheng-Lung Chang, Taoyuan (TW); Chin-Lang Wu, Tongsiao Township (TW); Ying-Chieh Chao, Yongjing Township (TW); Shihn-Juh Liou, Hsinchu (TW); Wen-Chung Liang, Hsinchu (TW)

(73) Assignee: INDUSTRIAL TECHNOLOGY RESEARCH INSTITUTE, Hsinchu (TW)

(*) Notice: Subject to any disclaimer, the term of this patent is extended or adjusted under 35 U.S.C. 154(b) by 414 days.

(21) Appl. No.: 16/731,449

(22) Filed: Dec. 31, 2019

(65) Prior Publication Data
US 2021/0198438 A1     Jul. 1, 2021

(51) Int. Cl.
*C08J 5/04* (2006.01)
*C08J 9/00* (2006.01)
*C08J 9/12* (2006.01)

(52) U.S. Cl.
CPC ............ *C08J 5/047* (2013.01); *C08J 9/0085* (2013.01); *C08J 9/122* (2013.01);
(Continued)

(58) Field of Classification Search
CPC . C08J 5/047; C08J 9/0085; C08J 9/122; C08J 2203/182; C08J 2205/044;
(Continued)

(56) References Cited

U.S. PATENT DOCUMENTS

| 6,984,476 B2 | 1/2006 | Kobayashi et al. |
| 7,834,080 B2 | 11/2010 | Sarukawa |

(Continued)

FOREIGN PATENT DOCUMENTS

| CN | 107265976 A | 10/2017 |
| CN | 108384188 A | 8/2018 |

(Continued)

OTHER PUBLICATIONS

Taiwanese Office Action and Search Report, dated Jun. 30, 2020, for Taiwanese Application No. 108148508.

*Primary Examiner* — Kara B Boyle
(74) *Attorney, Agent, or Firm* — Birch, Stewart, Kolasch & Birch, LLP (57) ABSTRACT

A composite material and a foam prepared from the composite material are provided. The composite material includes a network polymer, a fluorine-containing polymer fiber, and a reinforcement fiber. The polymer network is a crosslinking reaction product of a polymer and an oligomer, wherein the polymer is polyamide, polyester, polyurethane, or a combination thereof, and the oligomer is a vinyl aromatic-co-acrylate oligomer with an epoxy functional group. The oligomer has a weight percentage of 1% to 10%, based on the weight of the network polymer. The ratio of the weight of the reinforcement fiber to the total weight of the network polymer and the fluorine-containing polymer fiber is from 1:9 to 4:6.

18 Claims, 6 Drawing Sheets

(52) U.S. Cl.
CPC .... *C08J 2203/182* (2013.01); *C08J 2205/044* (2013.01); *C08J 2377/00* (2013.01); *C08J 2427/18* (2013.01)

(58) Field of Classification Search
CPC ............... C08J 2377/00; C08J 2427/18; C08J 2201/026; C08J 2367/00; C08J 2423/28; C08J 2427/12; C08J 9/0061
See application file for complete search history.

(56) References Cited

U.S. PATENT DOCUMENTS

| | | |
|---|---|---|
| 8,163,810 B2 | 4/2012 | Howie, Jr. et al. |
| 8,557,905 B2 | 10/2013 | Shimokoba et al. |
| 9,006,306 B2 | 4/2015 | La Camera et al. |
| 9,142,146 B2 | 9/2015 | Merkle et al. |
| 9,260,585 B2 | 2/2016 | Sasaki et al. |
| 9,808,987 B1 | 11/2017 | Merkle et al. |
| 10,113,039 B2 | 10/2018 | Hoekstra et al. |
| 10,301,468 B2 | 5/2019 | Maurer et al. |
| 2004/0092638 A1 | 5/2004 | Martens et al. |
| 2018/0118867 A1 | 5/2018 | Hayakawa et al. |

FOREIGN PATENT DOCUMENTS

| | | | | |
|---|---|---|---|---|
| CN | 108422725 A | | 8/2018 | |
| CN | 208484332 U | | 2/2019 | |
| CN | 110499005 A | * | 11/2019 | ............ C08G 59/08 |
| JP | 5107703 A | | 10/2012 | |
| JP | 2017-179244 A | | 10/2017 | |
| JP | 6498966 A | | 3/2019 | |
| TW | I530597 B | | 4/2016 | |
| TW | 201728648 A | * | 8/2017 | ............ B29B 15/14 |

\* cited by examiner

COMPOSITE MATERIAL AND FOAM PREPARED FROM THE SAME

TECHNICAL FIELD

The disclosure relates to a composite material and a foam prepared from the same.

BACKGROUND

Fiber-reinforced synthetic resin has many advantages: it is lightweight and it has high mechanical strength. In recent years, it has been widely applied in automobile, shipbuilding, aviation, medical, and construction areas. A fiber-reinforced synthetic resin sheet usually comprises a woven or a non-woven substrate made of high strength fibers, such as glass fibers, and this substrate is impregnated with a resin. Therefore, the fiber-reinforced synthetic resin sheet has better strength compared to a general resin sheet which is not reinforced with fibers.

Automobiles are ubiquitous, and as such are a main source of air pollution because of their exhaust and their energy consumption. Therefore, lightweight materials for use in automotive is a significant direction for improvement. The use of lightweight materials can reduce the weight of an automobile, which in turn can reduce fuel consumption and exhaust emissions.

In order to obtain a fiber-reinforced resin composite material with excellent strength and light weight, methods for fabricating fiber-reinforced resin foam in the presence of a foaming agent have been developed. Due to the low melt strength and bubble retention of conventional resins, the obtained foam would have defects (such as surface explosion, or formation of surface voids or inner voids). Furthermore, when using a supercritical fluid as a physical foaming agent, the obtained foams may have cells with non-uniform cell size due to phase separation of the components of the composite material, thereby deteriorating characteristics of the foam.

SUMMARY

The disclosure provides a composite material. According to embodiments of the disclosure, the composite material includes a network polymer, a fluorine-containing polymer fiber, and a reinforcement fiber. The network polymer is a crosslinking reaction product of a polymer and an oligomer, wherein the polymer is polyamide, polyester, polyurethane, or a combination thereof. The oligomer is a vinyl aromatic-co-acrylate oligomer with an epoxy functional group, wherein the weight percentage of the oligomer is about 1% to 10%, based on the weight of the network polymer. The ratio of the weight of the reinforcement fiber to the total weight of the network polymer and the fluorine-containing polymer fiber is from about 1:9 to 4:6.

The disclosure also provides a foam which is fabricated from the composite material. According to embodiments of the disclosure, the foam includes the composite material and a plurality of foam cells, wherein the foam cells are disposed in the composite material.

A detailed description is given in the following embodiments with reference to the accompanying drawings.

DETAILED DESCRIPTION

The composite material and the foam prepared from the same of the disclosure are described in detail in the following description. In the following detailed description, for purposes of explanation, numerous specific details and embodiments are set forth in order to provide a thorough understanding of the present disclosure. The specific elements and configurations described in the following detailed description are set forth in order to clearly describe the present disclosure. It will be apparent, however, that the exemplary embodiments set forth herein are used merely for the purpose of illustration, and the inventive concept may be embodied in various forms without being limited to those exemplary embodiments.

The disclosure provides a composite material and a foam fabricated from the composite material. According to embodiments of the disclosure, the composite material includes a network polymer, a fluorine-containing polymer, and a reinforcement fiber. During the formation of the foam fabricated from the composite material, a specific configuration (for example a fiber shape (having an aspect ratio greater than or equal to 50)) and content of the fluorine-containing polymer can assist the foaming agent to be uniformly adsorbed on the fluorine-containing polymer and be dispersed in the composite material. Therefore, the foam cells of the obtained foam have a more uniform size (for example the difference between the foam cell pore diameter distribution D90 and the foam cell pore diameter distribution D10 is from 20 μm to 35 μm), thereby avoiding the formations of defects (such as surface explosion, or formation of surface voids or inner voids). Furthermore, the foam, which is fabricated from the composite material of the disclosure, can achieve the technical purpose of the formation of lightweight and high mechanical strength foam. In addition, since the network polymer and the fluorine-containing polymer can form a semi-interpenetrating polymer network, the melt strength of the composite material can be enhanced.

According to embodiments of the disclosure, the composite material includes a network polymer, a fluorine-containing polymer fiber, and a reinforcement fiber. According to embodiments of the disclosure, the reinforcement fiber of the composite material has an average length between about 0.01 mm to 1 mm, such as 0.02 mm, 0.05 mm, 0.1 mm, 0.2 mm, 0.5 mm, or 0.8 mm. The reinforcement fiber can include glass fiber, carbon fiber, or a combination thereof.

According to embodiments of the disclosure, the network polymer and the fluorine-containing polymer fiber can form a semi-interpenetrating polymer network, wherein the reinforcement fiber is uniformly dispersed in the semi-interpenetrating polymer network. In the disclosure, the semi-interpenetrating polymer network means a network including the fluorine-containing polymer fibers and the network polymer, wherein the network polymer is cross-linked, and the fluorine-containing polymer fiber is not cross-linked. The network polymer and the fluorine-containing polymer fiber are not simply mixing together, but they are closely associated with each other, i.e. the cross-linked network polymer physically entangles with at least a part of the non-cross-linked fluorine-containing polymer fiber. Due to the hydrophobic properties and high cohesion of the fluorine-containing polymer fiber, the introduced foaming agent would form relatively small airbags which are attached on the fluorine-containing polymer fiber, while the composite material of the disclosure is subjected to a foaming process. Therefore, the obtained foam has foam cells with more uniform foam cell size and exhibits higher foam cell density, thereby reducing defects formation.

According to some embodiments of the disclosure, the composite material consists of a network polymer, a fluorine-containing polymer fiber, and a reinforcement fiber. According to embodiments of the disclosure, the ratio of the weight of the reinforcement fiber to the total weight of the network polymer and the fluorine-containing polymer fiber is from about 1:9 to 4:6, such as 1:8, 1:7, 1:6, 1:5, 1:4, 1:3, or 1:2. When the amount of the reinforcement fiber is too low, the effect of thermal stability, which is reinforced by physical strength, is not obvious, and the composite material exhibits a relatively high dimensional shrinkage. When the amount of the reinforcement fiber is too high, the surface flatness and processability of materials would be affected since the fibers easily protrude out of the surface of the composite material, resulting in that the application of the product fabricated from the composite material is restricted.

According to embodiments of the disclosure, the fluorine-containing polymer fiber can be polytetrafluoroethylene (PTFE) fiber, polyvinylidene fluoride (PVDF) fiber, perfluoroalkoxy alkane (PFA) fiber, fluorinated ethylene propylene (FEP) fiber, or a combination thereof. According to embodiments of the disclosure, the fluorine-containing polymer fiber can have a number average molecular weight of about 5,000 to 500,000, such as 10,000, 20,000, 50,000, 80,000, 100,000, 200,000, 300,000, or 400,000. According to embodiments of the disclosure, in order to assist the fluorine-containing polymer fiber to closely associate with the network polymer and even to form a semi-interpenetrating polymer network via physical entanglement, the fluorine-containing polymer fiber can have an average aspect ratio greater than 5, such as 5 to 2000, 10 to 2000, 20 to 2000, or 10 to 1500. According to embodiments of the disclosure, the fluorine-containing polymer fiber can have a weight percentage of about 0.1 wt % to 2 wt %, such as 0.2 wt %, 0.3 wt %, 0.4 wt %, 0.5 wt %, 0.6 wt %, 0.7 wt %, 0.8 wt %, 0.9 wt %, 1 wt %, 1.1 wt %, 1.2 wt %, 1.3 wt %, 1.4 wt %, 1.5 wt %, 1.6 wt %, 1.7 wt %, 1.8 wt %, or 1.9 wt %, based on the total weight of the network polymer, the fluorine-containing polymer fiber, and the reinforcement fiber. When the weight percentage of the fluorine-containing polymer fiber is too low, a phase separation would occur between the foaming agent and the composite material since the amount of the foaming agent adsorbed by the fluorine-containing polymer fiber is too low. The phase separation will result in increasing foam defects, broadening foam cell size distribution, and the formation of gas bubbles. When the weight percentage of the fluorine-containing polymer fiber is too high, the fluorine-containing polymer fiber is apt to aggregate in the composite material, thereby deteriorating the composite material processability.

According to some embodiments of the disclosure, the fluorine-containing polymer fiber can have a weight percentage of about 0.1 wt % to 2 wt %, based on the total weight of the semi-interpenetrating polymer network and the reinforcement fiber.

According to embodiments of the disclosure, the network polymer is a crosslinking reaction product of a polymer and an oligomer. According to embodiments of the disclosure, the polymer can be polyamide, polyester, polyurethane, or a combination thereof. The polymer can have a number average molecular weight of about 5,000 to 500,000, such as 7500, 10,000, 20,000, 50,000, 80,000, 100,000, 200,000, 300,000, or 400,000. According to embodiments of the disclosure, the polyamide can be polycaprolactam, polyhexamethylene adipamide, polylaurolactam, polydodecanoamide, polybutyrolactam, polyhexamethylene dodecanoamide, polyundecanoamide, polyhexamethylene sebacamide, or polydecamethylene sebacamide. According to embodiments of the disclosure, the polyester can be polyethylene terephthalate (PET), polybutylene terephthalate (PBT), polyethylene terephthalate glycol (PETG), polycyclohexylenedimethylene terephthalate glycol (PCTG), polybutylene terephthalate (PBT), polycyclohexylenedimethylene terephthalate (PCT), polyethylene naphthalate (PEN), or polytrimethylene terephthalate (PTT).

According to embodiments of the disclosure, the oligomer can be vinyl aromatic-co-acrylate oligomer with epoxy functional group. According to embodiments of the disclosure, the oligomer can have a molecular weight (such as number average molecular weight) of about 200 to 65,000, such as 250 to 65,000, 1,000 to 65,000, 2,000 to 65,000, 3,000 to 65,000, 4,000 to 65,000, 5,000 to 60,000, 1,000 to 50,000, 2,000 to 50,000, 3,000 to 50,000, 4,000 to 50,000, or 2,000 to 30,000. According to embodiments of the disclosure, the oligomer can have an epoxide equivalent of about 200 to 2,000, such as 250 to 2,000, 300 to 2,000, 350 to 2,000, 300 to 1,800, or 300 to 1,600.

According to embodiments of the disclosure, the vinyl aromatic-co-acrylate oligomer with an epoxy functional group can be a copolymer of a vinyl aromatic monomer and an acrylate-based monomer, wherein the acrylate-based monomer at least includes acrylate monomer with an epoxy functional group. According to embodiments of the disclosure, the acrylate monomer with an epoxy functional group can be glycidyl acrylate, glycidyl methacrylate, 3,4-epoxybutyl methacrylate, 3,4-epoxybutyl acrylate, or a combination thereof. According to embodiments of the disclosure, the vinyl aromatic monomer can be styrene, methylstyrene, ethylstyrene, propylstyrene, cyclohexyl styrene, vinyl biphenyl, or a combination thereof. According to embodiments of the disclosure, the acrylate-based monomer can further include methyl acrylate, methyl methacrylate, ethyl acrylate, ethyl methacrylate, n-butyl acrylate, n-butyl methacrylate, sec-butyl acrylate, sec-butyl methacrylate, tert-butyl acrylate, tert-butyl methacrylate, cyclohexyl acrylate, cyclohexyl methacrylate, or a combination thereof.

Due to the epoxy functional group of the oligomer of the disclosure, the oligomer can react with the polymer (such as polyamide, polyester, or polyurethane) to undergo a cross-linking reaction, thereby forming a network polymer. The cross-linking degree of the network polymer of the disclosure can be modified by adjusting the amount ratio of the repeating unit with an epoxy functional group (for example, repeating unit derived from acrylate monomer with an epoxy functional group) to the repeating unit without an epoxy functional group (for example, repeating unit derived from vinyl aromatic monomer and acrylate monomer without an epoxy functional group). In addition, since the oligomer having a repeating unit with an aromatic cyclic group (derived from vinyl aromatic monomer), the aromatic cyclic group can enhance the adsorption of the foaming agent. Therefore, the obtained foam has foam cells with more uniform foam cell size and higher foam cell density, thereby reducing the defects formation.

According to embodiments of the disclosure, the oligomer used for forming the network polymer can have a weight percentage of about 1% to 10% (such as 2%, 3%, 4%, 5%, 6%, 7%, 8%, or 9%), based on the total weight of the polymer and the oligomer (approximately considered as the weight of the network polymer). When the amount of the oligomer is too low, the melt strength of the composite material could not be improved, thereby increasing the difficulty of the subsequent foaming process. When the amount of the oligomer is too high, the composite material would not melt due to too high a cross-linking degree of the network polymer, resulting in that the composite material could not be used to form a foam.

According to embodiments of the disclosure, the vinyl aromatic-co-acrylate oligomer with an epoxy functional group can be a copolymer of vinyl aromatic monomer and acrylate monomer with an epoxy functional group. In addition, according to embodiments of the disclosure, the vinyl aromatic-co-acrylate oligomer with an epoxy functional group can be a copolymer of vinyl aromatic monomer, a first acrylate monomer and a second acrylate monomer, wherein the first acrylate monomer can be acrylate monomer with an epoxy functional group, and the second acrylate monomer is distinct from the first acrylate monomer. According to embodiments of the disclosure, the second acrylate monomer can be methyl acrylate, methyl methacrylate, ethyl acrylate, ethyl methacrylate, n-butyl acrylate, n-butyl methacrylate, sec-butyl acrylate, sec-butyl methacrylate, tert-butyl acrylate, tert-butyl methacrylate, cyclohexyl acrylate, cyclohexyl methacrylate, or a combination thereof.

According to embodiments of the disclosure, the vinyl aromatic-co-acrylate oligomer with an epoxy functional group has repeating units of arranged in a block, an alternating fashion, or a random fashion, wherein $R^1$, $R^2$, $R^4$, $R^6$, or $R^7$ are independently hydrogen or $C_{1-6}$ alkyl group; $R^3$ is hydrogen, $C_{1-6}$ alkyl group, $C_{5-7}$ cycloalkyl group, or phenyl group; and $R^5$ is $C_{1-6}$ alkyl group, or $C_{5-7}$ cycloalkyl group. According to embodiments of the disclosure, $C_{1-6}$ alkyl group can be linear or branched alkyl group. For example, $C_{1-6}$ alkyl group can be methyl, ethyl, propyl, butyl, pentyl, hexyl, or an isomer thereof. According to embodiments of the disclosure, $C_{5-7}$ cycloalkyl group can be cyclopentyl, cyclohexyl, or cycloheptyl.

According to embodiments of the disclosure, the vinyl aromatic-co-acrylate oligomer with an epoxy functional group can have x number of repeating unit, y number of repeating unit, and z number of repeating unit, wherein x, y and z are independently an integer from 1 to 30, such as 2, 3, 4, 5, 6, 7, 8, 9, 10, 11, 12, 13, 14, 15, 16, 17, 18, 19, 20, 21, 22, 23, 24, 25, 26, 27, 28, or 29. According to embodiments of the disclosure, z:(x+y) can be from 2:1 to 20:1. When the ratio of z to x+y (z/(x+y)) is too low, the cross-linking degree of the network polymer is reduced due to the low amount of epoxy functional group for undergoing cross-linking reaction, thereby reducing the melt strength of the composite material. When the ratio of z to x+y (z/(x+y)) is too high, the processability of composite material would be affected by high cross-linking density which is resulted from the high amount of epoxy functional group for undergoing cross-linking reaction.

According to embodiments of the disclosure, the method for fabricating the composite material can include the following steps. First, a composition is provided, wherein the composition can include polymer (such as polyamide, polyester, polyurethane, or a combination thereof), oligomer, and fluorine-containing polymer (granules, with a particle size of 1 μm to 200 μm). According to some embodiments of the disclosure, the composition can optionally further include an additive, such as process oil, initiator, stabilizer, melt strength enhancer, antioxidant, antistick agent, antistatic agent, or a combination thereof. The amount of additive is not limited, and can be optionally modified by a person of ordinary skill in the field. In the composition, the weight percentage of the oligomer can have a weight percentage of 1 wt % to 10 wt %, based on the total weight of the polymer and the oligomer. Next, the composition is added into a twin-screw extruder (with an aspect ratio of about 40 to 60) to be subjected to a melt blending process, wherein the screw speed is from 60 rpm to 300 rpm, and the barrel temperature is from 180° C. to 220° C. In this stage, the polymer reacts with the oligomer to undergo a cross-linking reaction to form a network polymer. Next, after performing the melt blending process for 0.1 minutes-5 minutes, the barrel temperature of the twin-screw extruder is increased with a predetermined gradient to about 250° C.-265° C. and then subjected to the melt blending process for 0.1 minutes-5 minutes. In this stage, due to the increase of temperature and the shear force, the fluorine-containing polymer is gradually converted from a granular-shaped to a fiber-shaped, and the obtained fluorine-containing polymer fiber further physically entangles with the network polymer to form a semi-interpenetrating polymer network. Next, a reinforcement fiber is added into the twin-screw extruder and a strand extrusion is performed and the result is subjected to a pelletization, obtaining a composite material masterbatch. In the composite material, the fluorine-containing polymer fiber has a weight percentage of 0.1 wt % to 2 wt %, based on the weight of the composite material.

According to embodiments of the disclosure, the disclosure also provides a foam, wherein the foam is prepared from the composite material of the disclosure, and plurality of foam cells are disposed in the composite material. According to embodiments of the disclosure, due to the composite material of the disclosure, the foam cells of the obtained foam have an average pore diameter (Davg) between about 10 μm and 50 μm, and the difference between the pore diameter distribution D90 and the pore diameter distribution D10 of the foam cells is from 20 μm to 35 μm (such as 21 μm, 22 μm, 23 μm, 24 μm, 25 μm, 26 μm, 27 μm, 28 μm, 29 μm, 30 μm, 31 μm, 32 μm, 33 μm, or 34 μm). According to embodiments of the disclosure, when the form has a relatively low difference between the pore diameter distribution D90 and the pore diameter distribution D10 of foam cells, the foam would have a relatively uniform foam cell size. Herein, the foam cell pore diameter distribution D90 is a value on the distribution such that 90% by volume of the foam cells have a diameter less than this value. Furthermore, the foam cell pore diameter distribution D10 is a value on the distribution such that 10% by volume of the foam cells have a diameter less than this value. According to embodiments of the disclosure, the foam cell pore diameter distribution D90 and the foam cell pore diameter distribution D10 are determined by the method according to ISO 13322-1:2014. According to embodiments of the disclosure, the foam cell pore diameter distribution D90 of the foam is less than or equal to 50 μm (such as less than or equal to 45 μm), in order to avoid the decrease of the mechanical strength of the foam or the formation of defects (such as foam cell collapse) due to the formation of foam cells with large foam cell size. Furthermore, the foam, which is fabricated from the composite material of the disclosure, can achieve the technical purpose of the formation of lightweight and high mechanical strength foam.

According to embodiments of the disclosure, the composite material of the disclosure can have a melt flow index of 0.7 to 20, such as 1 to 6, 1 to 5.5, 1 to 5, 1 to 4.5, 1 to 4, 1 to 3.5, or 1 to 3. The melt flow index is determined by the method according to ASTM-D-1238 at a load of 2.16 kg and a temperature of 275° C.

According to embodiments of the disclosure, the method for fabricating the foam from the composite material of the disclosure includes the following steps. First, the composite material masterbatch is dried at a temperature between 80° C. and 100° C. for 8 hours-12 hours. Next, the dried composite material masterbatch is subjected to a microcellular foaming process to obtain a foam. The foaming process is performed by a supercritical fluid within the microcellular foam injection molding machine in the condition that the process temperature is between 200° C. and 300° C., the gas pressure is between 1000 psi and 3000 psi, and the volume ratio of nitrogen gas to carbon dioxide is from 10:1 to 6:4.

Below, exemplary embodiments will be described in detail with reference to the accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

EXAMPLES

Table 1 lists the material involved in the examples of the disclosure.

TABLE 1

| | |
|---|---|
| Polyamide (1) | trade number: sunylon 6N<br>supplier: Formosa Chemicals and Fiber Corporation<br>melting point: 220.3° C.<br>Mn: 20000-30000 g/mole |
| Polyamide (2) | trade number: Gramid N200GP<br>supplier: Grand Pacific Petrochemical Corporation<br>Mn: 15000-25000 g/mole<br>melting point: 280-300° C. |
| polyethylene terephthalate (PET) | trade number: L316<br>supplier: Lealea Enterprise Co., Ltd<br>Mn: 25000-35000 g/mole<br>melting point: 245-255° C. |
| thermoplastic polyester elastomer | trade number: Hytrel 5556<br>supplier: Du Pont Taiwan Ltd<br>Mn: 20000-30000 g/mole<br>melting point: 220-250° C. |
| Oligomer (1) | trade number: JONCRYL ® ADR-4300<br>supplier: BASF<br>molecular weight: 5500 g/mole<br>epoxide equivalent: 445 g/mole<br>The ratio of the amount of acrylate repeating unit with a glycidyl group to the total amount of the styrene repeating unit and the acrylate repeating unit (without a glycidyl group) = 4:1 |
| Oligomer (2) | trade number: JONCRYL ® ADR-4368<br>supplier: BASF<br>molecular weight: 6800 g/mole<br>epoxide equivalent: 285 g/mole<br>The ratio of the amount of acrylate repeating unit with a glycidyl group to the total amount of the styrene repeating unit and the acrylate repeating unit (without a glycidyl group) = 4:1 |
| Oligomer (3) | trade number: JONCRYL ® ADR-4370<br>supplier: BASF<br>molecular weight: 7000 g/mole<br>epoxide equivalent: 300 g/mole<br>The ratio of the amount of acrylate repeating unit with a glycidyl group to the total amount of the styrene repeating unit and the acrylate repeating unit (without a glycidyl group) = 4:1 |
| Oligomer (4) | trade number: JONCRYL ® ADR-4370s<br>supplier: BASF<br>molecular weight: 45000 g/mole<br>epoxide equivalent: 1530 g/mole |

TABLE 1-continued

| | |
|---|---|
| polytetrafluoro-ethylene (PTFE) | The ratio of the amount of acrylate repeating unit with a glycidyl group to the total amount of the styrene repeating unit and the acrylate repeating unit (without a glycidyl group) = 4:1<br>trade number: 430935<br>supplier: Aldrich<br>melting point: 321° C.<br>particle size: about 40 μm |
| glass fiber | trade number: Taiwanglass anti-hydrolysis glass Chopped Strand TGFS 173X<br>single fiber diameter: 10~13 μm (±1.4 μm) |
| process oil | castor oil<br>CAS NO. 8001-79-4<br>supplier: Sigma<br>boiling point: 313° C. |

Preparation of Composite Material Masterbatch

Example 1

67.32 parts by weight of Polyamide (1), 0.68 parts by weight of Oligomer (1), 2 parts by weight of polytetrafluoroethylene (PTFE), and 0.1 parts by weight of process oil were added into a twin-screw extruder (available under the trade designation of ZSK-25, with an L/D ratio of 40) to perform a melt blending process, wherein the screw speed was set at 200 rpm, and the barrel temperature was set as 220° C., thereby reacting Polyamide (1) with Oligomer (1). Next, the temperature of the twin-screw extruder was increased from 220° C. to 280° C. with a predetermined gradient. After performing the melt blending process for 1.5 minutes, the granular polytetrafluoroethylene (PTFE) was softened and then stretched to form a fiber-shaped polytetrafluoroethylene (PTFE). Next, 30 parts by weight of glass fiber were added into the twin-screw extruder. After performing a melt blending process for 1.5 minutes, a strand extrusion was performed and the result was subjected to a pelletization by a pelletizer (GZML-110L-150) at a temperature of 50-100° C. at a screw speed of 20 rpm, obtaining Composite material masterbatch (1).

Next, the melt flow index (MI), the tensile strength, and the impact strength of Composite material masterbatch (1) were measured, and the results are shown in Table 1. The melt flow index was determined by the method according to ASTM-D-1238; the tensile strength was determined by the method according to ASTM D412; and the impact strength was determined by the method according to ASTMD-638. In addition, the average aspect ratio of the fiber-shaped polytetrafluoroethylene (PTFE) within Composite material masterbatch (1) was measured, and the result is shown in Table 1.

Example 2

Example 2 was performed in the same manner as in Example 1 except that the weight of Polyamide (1) was reduced from 67.32 parts by weight to 66.64 parts by weight, and the weight of Oligomer (1) was increased from 0.68 parts by weight to 1.36 parts by weight, obtaining Composite material masterbatch (2). Next, the melt flow index (MI), the tensile strength, and the impact strength of Composite material masterbatch (2) were measured, and the results are shown in Table 1. In addition, the average aspect ratio of the fiber-shaped polytetrafluoroethylene (PTFE) within Composite material masterbatch (2) was measured, and the result is shown in Table 1.

Example 3

Example 3 was performed in the same manner as in Example 1 except that the weight of Polyamide (1) was reduced from 67.32 parts by weight to 66 parts by weight, and the weight of Oligomer (1) was increased from 0.68 parts by weight to 2 parts by weight, obtaining Composite material masterbatch (3). Next, the melt flow index (MI), the tensile strength, and the impact strength of Composite material masterbatch (3) were measured, and the results are shown in Table 1. In addition, the average aspect ratio of the fiber-shaped polytetrafluoroethylene (PTFE) within Composite material masterbatch (3) was measured, and the result is shown in Table 1.

Example 4

Example 4 was performed in the same manner as in Example 1 except that the weight of Polyamide (1) was reduced from 67.32 parts by weight to 64.6 parts by weight, and the weight of Oligomer (1) was increased from 0.68 parts by weight to 3.4 parts by weight, obtaining Composite material masterbatch (4). Next, the melt flow index (MI), the tensile strength, and the impact strength of Composite material masterbatch (4) were measured, and the results are shown in Table 1. In addition, the average aspect ratio of the fiber-shaped polytetrafluoroethylene (PTFE) within Composite material masterbatch (4) was measured, and the result is shown in Table 1.

Example 5

Example 5 was performed in the same manner as in Example 1 except that the weight of Polyamide (1) was reduced from 67.32 parts by weight to 62.56 parts by weight, and the weight of Oligomer (1) was increased from 0.68 parts by weight to 5.44 parts by weight, obtaining Composite material masterbatch (5). Next, the melt flow index (MI), the tensile strength, and the impact strength of Composite material masterbatch (5) were measured, and the results are shown in Table 1. In addition, the average aspect ratio of the fiber-shaped polytetrafluoroethylene (PTFE) within Composite material masterbatch (5) was measured, and the result is shown in Table 1.

Example 6

Example 6 was performed in the same manner as in Example 1 except that the weight of Polyamide (1) was reduced from 67.32 parts by weight to 61.2 parts by weight, and the weight of Oligomer (1) was increased from 0.68 parts by weight to 6.8 parts by weight, obtaining Composite material masterbatch (6). Next, the melt flow index (MI), the tensile strength, and the impact strength of Composite material masterbatch (6) were measured, and the results are shown in Table 1. In addition, the average aspect ratio of the fiber-shaped polytetrafluoroethylene (PTFE) within Composite material masterbatch (6) was measured, and the result is shown in Table 1.

Comparative Example 1

68 parts by weight of polyamide (1), 2 parts by weight of polytetrafluoroethylene (PTFE), and 0.1 parts by weight of process oil were added into a twin-screw extruder (available under the trade designation of ZSK-25, with an L/D ratio of 40) to perform a melt blending process, wherein the screw speed was set at 200 rpm, and the barrel temperature was set as 220° C. After performing the melt blending process for 1.5 minutes, a granular polytetrafluoroethylene (PTFE) was softened and then stretched to form a fiber-shaped polytetrafluoroethylene (PTFE). Next, 30 parts by weight of glass fiber were added into a twin-screw extruder. After performing a melt blending process for 1.5 minutes, a strand extrusion was performed and the result was subjected to a pelletization by a pelletizer (GZML-110L-150) at a temperature of 50-100° C. at a screw speed of 20 rpm, obtaining Composite material masterbatch (7).

Next, the melt flow index (MI), the tensile strength, and the impact strength of Composite material masterbatch (7) were measured, and the results are shown in Table 1.

TABLE 1

|  | the ratio of oligomer to polyamide | melt flow index (g/10 min) (275° C.) | tensile strength (kgf/cm$^2$) | impact strength (J/m) | average fiber aspect ratio of polytetrafluoroethylene (PTFE) |
| --- | --- | --- | --- | --- | --- |
| Example 1 | 1:99 | 3.4 | 1048 | 140 | ~1100 |
| Example 2 | 2:98 | 2.1 | 1322 | 127 | ~1100 |
| Example 3 | 3:97 | 1.4 | 1581 | 117 | ~1100 |
| Example 4 | 5:95 | 1.0 | 1555 | 87 | ~1100 |
| Example 5 | 8:92 | 0.8 | 1568 | 61 | ~1100 |
| Example 6 | 10:90 | 0.7 | 1530 | 43 | ~1100 |
| Comparative Example 1 | 0:100 | 6.6 | 774 | 152 | — |

Since the contents of the composite material masterbatch of Comparative Example 1 did not include the styrene-acrylate oligomer with an epoxy functional group (which could react with polyamide to form a polymer network), the polyamide of the composite material masterbatch of Comparative Example 1 was unable to associate with polytetrafluoroethylene (PTFE) fiber to form a semi-interpenetrating polymer network. As a result, as shown in Table 1, the composite material masterbatch of Comparative Example 1 exhibits a relatively high melt flow index (greater than 6.5). It means that the melt strength of the composite material is relatively low, and the composite material with low melt strength is disadvantageous for the subsequent foaming process. In addition, since the styrene-acrylate oligomer with an epoxy functional group was added to react with polyamide to form a network polymer in Examples 1-6, the modified polyamide (i.e. network polymer) of the composite material masterbatch of Examples 1-6 is able to associate with polytetrafluoroethylene (PTFE) fiber to form a semi-interpenetrating polymer network, thereby further improving the melt strength of the composite material.

Example 7

68.11 parts by weight of polyamide (1), 1.39 parts by weight of oligomer (1), 0.5 parts by weight of polytetrafluoroethylene (PTFE), and 0.1 parts by weight of process oil were added into a twin-screw extruder (available under the trade designation of ZSK-25, with an L/D ratio of 40) to perform a melt blending process, wherein the screw speed was set at 200 rpm, and the barrel temperature was set as 220° C., thereby reacting Polyamide (1) with Oligomer (1).

Next, the temperature of the twin-screw extruder was increased from 220° C. to 280° C. with a predetermined gradient. After performing the melt blending process for 1.5 minutes, a granular polytetrafluoroethylene (PTFE) was softened and then stretched to form a fiber-shaped polytetrafluoroethylene (PTFE). Next, 30 parts by weight of glass fiber were added into the twin-screw extruder. After performing a melt blending process for 1.5 minutes, a strand extrusion was performed and the result was subjected to a pelletization by a pelletizer (GZML-110L-150) at a temperature of 50-100° C. at a screw speed of 20 rpm, obtaining Composite material masterbatch (8). Herein, the amount of polytetrafluoroethylene (PTFE) fiber was of about 0.5 wt %, based on the weight of Composite material masterbatch (8).

Next, the melt flow index (MI), the tensile strength, and the impact strength of Composite material masterbatch (8) were measured, and the results are shown in Table 2.

Example 8

Example 8 was performed in the same manner as in Example 7 except that the weight of Polyamide (1) was reduced from 68.11 parts by weight to 67.62 parts by weight, the weight of Oligomer (1) was reduced from 1.39 parts by weight to 1.38 parts by weight, and the weight of polytetrafluoroethylene (PTFE) was increased from 0.5 parts by weight to 1 part by weight, obtaining Composite material masterbatch (9). Herein, the amount of polytetrafluoroethylene (PTFE) fiber was of about 1 wt %, based on the weight of Composite material masterbatch (9). Next, the melt flow index (MI), the tensile strength, and the impact strength of Composite material masterbatch (9) were measured, and the results are shown in Table 2.

Example 9

Example 9 was performed in the same manner as in Example 7 except that the weight of Polyamide (1) was reduced from 68.11 parts by weight to 67.13 parts by weight, the weight of Oligomer (1) was reduced from 1.39 parts by weight to 1.37 parts by weight, and the weight of polytetrafluoroethylene (PTFE) was increased from 0.5 parts by weight to 1.5 parts by weight, obtaining Composite material masterbatch (10). Herein, the amount of polytetrafluoroethylene (PTFE) fiber was of about 1.5 wt %, based on the weight of Composite material masterbatch (10). Next, the melt flow index (MI), the tensile strength, and the impact strength of Composite material masterbatch (10) were measured, and the results are shown in Table 2.

Comparative Example 2

Comparative Example 2 was performed in the same manner as in Example 7 except that the weight of Polyamide (1) was increased from 68.11 parts by weight to 68.6 parts by weight, the weight of Oligomer (1) was increased from 1.39 parts by weight to 1.4 parts by weight, and the weight of polytetrafluoroethylene (PTFE) was reduced from 0.5 parts by weight to 0 parts by weight, obtaining Composite material masterbatch (11) (in the absence of polytetrafluoroethylene (PTFE)). Next, the melt flow index (MI), the tensile strength, and the impact strength of Composite material masterbatch (11) were measured, and the results are shown in Table 2.

Comparative Example 3

66.15 parts by weight of polyamide (1), 1.35 parts by weight of oligomer (1), 2.5 parts by weight of polytetrafluoroethylene (PTFE), and 0.1 parts by weight of process oil were added into a twin-screw extruder (available under the trade designation of ZSK-25, with an L/D ratio of 40) to perform a melt blending process, wherein the screw speed was set at 200 rpm, and the barrel temperature was set as 220° C., thereby reacting Polyamide (1) with Oligomer (1). Next, the temperature of the twin-screw extruder was increased from 220° C. to 280° C. with a predetermined gradient. After performing the melt blending process for 1.5 minutes, a granular polytetrafluoroethylene (PTFE) was softened and then stretched to form a fiber-shaped polytetrafluoroethylene (PTFE). Next, 30 parts by weight of glass fiber were added into the twin-screw extruder. After performing a melt blending process for 1.5 minutes, a strand extrusion was performed. Herein, the result obtained from the melt blending process was not apt to perform a strand extrusion and the strand tends to break during strand extrusion. It means the melt blending result exhibiting poor processability. The strand extrusion result was subjected to a pelletization by a pelletizer (GZML-110L-150) at a temperature of 50-100° C. at a screw speed of 20 rpm, obtaining Composite material masterbatch (12). Herein, the amount of polytetrafluoroethylene (PTFE) fiber was of about 2.5 wt %, based on the weight of Composite material masterbatch (12).

Next, the melt flow index (MI), the tensile strength, and the impact strength of Composite material masterbatch (12) were measured, and the results are shown in Table 2.

Comparative Example 4

65.66 parts by weight of polyamide (1), 1.34 parts by weight of oligomer (1), 3 parts by weight of polytetrafluoroethylene (PTFE), and 0.1 parts by weight of process oil were added into a twin-screw extruder (available under the trade designation of ZSK-25, with an L/D ratio of 40) to perform a melt blending process, wherein the screw speed was set at 200 rpm, and the barrel temperature was set as 220° C., thereby reacting Polyamide (1) with Oligomer (1). Next, the temperature of the twin-screw extruder was increased from 220° C. to 280° C. with a predetermined gradient. After performing the melt blending process for 1.5 minutes, a granular polytetrafluoroethylene (PTFE) was softened and then stretched to form a fiber-shaped polytetrafluoroethylene (PTFE). Next, 30 parts by weight of glass fiber were added into the twin-screw extruder. After performing a melt blending process for 1.5 minutes, the result was subjected to a strand extrusion. Herein, the result obtained from the melt blending process was not apt to perform a strand extrusion and the strand tends to break during strand extrusion. It means the melt blending result exhibiting poor processability. The strand extrusion result was subjected to a pelletization by a pelletizer (GZML-110L-150) at a temperature of 50-100° C. at a screw speed of 20 rpm, obtaining Composite material masterbatch (13). Herein, the amount of polytetrafluoroethylene (PTFE) fiber was of about 2.5 wt %, based on the weight of Composite material masterbatch (13).

Next, the melt flow index (MI), the tensile strength, and the impact strength of Composite material masterbatch (13) were measured, and the results are shown in Table 2.

TABLE 2

| | polytetrafluoroethylene (PTFE) (wt %) | processability | melt flow index (g/10 min) (275° C.) | tensile strength (kgf/cm$^2$) | impact strength (J/m) |
| --- | --- | --- | --- | --- | --- |
| Comparative Example 2 | 0 | good | 1.5 | 1644 | 152 |
| Example 7 | 0.5 | good | 1.7 | 1610 | 130 |
| Example 8 | 1 | good | 1.9 | 1661 | 129 |
| Example 9 | 1.5 | good | 1.6 | 1661 | 145 |
| Example 2 | 2 | good | 2.1 | 1322 | 127 |
| Comparative Example 3 | 2.5 | poor | 1.4 | 1281 | 121 |
| Comparative Example 4 | 3 | poor | 1.2 | 1097 | 122 |

As shown in Table 2, when the amount of polytetrafluoroethylene (PTFE) is greater than 2 wt %, a phase separation would occur which is caused by the aggregation of the excessive polytetrafluoroethylene. Therefore, the obtained composite material exhibits poor processability, and it is it disadvantageous for mass-production of composite material.

Example 10

66.5 parts by weight of polyamide (1), 2 parts by weight of oligomer (1), 1.5 parts by weight of polytetrafluoroethylene (PTFE), and 0.1 parts by weight of process oil were added into a twin-screw extruder (available under the trade designation of ZSK-25, with an L/D ratio of 40) to perform a melt blending process, wherein the screw speed was set at 200 rpm, and the barrel temperature was set as 220° C., thereby reacting Polyamide (1) with Oligomer (1). Next, the temperature of the twin-screw extruder was increased from 220° C. to 280° C. with a predetermined gradient. After performing the melt blending process for 1.5 minutes, a granular polytetrafluoroethylene (PTFE) was softened and then stretched to form a fiber-shaped polytetrafluoroethylene (PTFE). Next, 30 parts by weight of glass fiber were added into the twin-screw extruder. After performing a melt blending process for 1.5 minutes, a strand extrusion was performed and the result was subjected to a pelletization by a pelletizer (GZML-110L-150) at a temperature of 50-100° C. at a screw speed of 20 rpm, obtaining Composite material masterbatch (14).

Next, the tensile strength and the impact strength of Composite material masterbatch (14) were measured, and the results are shown in Table 3.

Example 11

Example 11 was performed in the same manner as in Example 10 except that Polyamide (1) was replaced with Polyamide (2), obtaining Composite material masterbatch (15). Next, the tensile strength and the impact strength of Composite material masterbatch (15) were measured, and the results are shown in Table 3.

Example 12

Example 12 was performed in the same manner as in Example 10 except that Polyamide (1) was replaced with polyethylene terephthalate (PET), obtaining Composite material masterbatch (16). Next, the tensile strength and the impact strength of Composite material masterbatch (16) were measured, and the results are shown in Table 3.

Example 13

Example 13 was performed in the same manner as in Example 10 except that Polyamide (1) was replaced with thermoplastic polyester elastomer (TPEE), obtaining Composite material masterbatch (17). Next, the tensile strength and the impact strength of Composite material masterbatch (17) were measured, and the results are shown in Table 3.

Comparative Example 5

96.5 parts by weight of thermoplastic polyester elastomer (TPEE), 2 parts by weight of oligomer (1), 1.5 parts by weight of polytetrafluoroethylene (PTFE), and 0.1 parts by weight of process oil were added into a twin-screw extruder (available under the trade designation of ZSK-25, with an L/D ratio of 40) to perform a melt blending process, wherein the screw speed was set at 200 rpm, and the barrel temperature was set as 220° C., thereby reacting thermoplastic polyester elastomer (TPEE) with Oligomer (1). Next, the temperature of the twin-screw extruder was increased from 220° C. to 280° C. with a predetermined gradient. After performing the melt blending process for 1.5 minutes, a granular polytetrafluoroethylene (PTFE) was softened and then stretched to form a fiber-shaped polytetrafluoroethylene (PTFE). Next, a strand extrusion was performed and the result was subjected to a pelletization by a pelletizer (GZML-110L-150) at a temperature of 50-100° C. at a screw speed of 20 rpm, obtaining Composite material masterbatch (18).

Next, the tensile strength and the impact strength of Composite material masterbatch (18) were measured, and the results are shown in Table 3.

TABLE 3

| | polymer | tensile strength (kgf/cm$^2$) | impact strength (J/m) |
|---|---|---|---|
| Example 10 | polyamide (1) | 1661 | 145 |
| Example 11 | polyamide (2) | 1902 | 82 |
| Example 12 | polyethylene terephthalate (PET) | 652 | 41 |

TABLE 3-continued

| | polymer | tensile strength (kgf/cm$^2$) | impact strength (J/m) |
|---|---|---|---|
| Example 13 | thermoplastic polyester elastomer | 289 | 288 |
| Comparative Example 5 | thermoplastic polyester elastomer | 183 | 134 |

Preparation of Foam

Examples 14-19 and Comparative Example 6

Composite material masterbatches (1)-(7) of Examples 1-6 and Comparative Example 1 were dried at 100° C. for 12 hours. Next, the dried Composite material masterbatch (1)-(7) were subjected to a microcellular foaming process individually, obtaining Foam (1)-(7). The foaming process was performed by a supercritical fluid within a microcellular foam injection molding machine (J450EL-MuCell, commercially available from Japan Steel Works LTD.) in the condition that the process temperature was 300° C., the gas pressure was 2000 psi, and the volume ratio of nitrogen gas to carbon dioxide was 7:3.

Next, the tensile strength and the impact strength of Foam (1)-(5) and (7) were measured. Furthermore, the foam cell size, foam cell density, and foam density of Foam (1)-(5) and (7) were determined by a non-destructive stereo-tomography (X-Ray Computerize Tomography (X-Ray CT)), and the results are shown in Table 4. FIGS. 1-7 are scanning electron microscope (SEM) photographs of Foams (1)-(7) respectively.

TABLE 4

| | the ratio of oligomer to polyamide | tensile strength (kgf/cm$^2$) | impact strength (J/m) | foam cell size (Davg) (μm) | D90 (μm) | D10 (μm) | foam cell density (10$^6$/cm$^3$) | foam density (g/cm$^3$) |
|---|---|---|---|---|---|---|---|---|
| Example 14 | 1:99 | 712 | 156 | 24.14 | 35 | 12 | 2.87 | 1.08 |
| Example 15 | 2:98 | 846 | 141 | 22.42 | 31 | 11 | 2.96 | 0.97 |
| Example 16 | 3:97 | 944 | 130 | 21.05 | 30 | 9 | 3.12 | 1.03 |
| Example 17 | 5:95 | 883 | 66 | 22.79 | 36 | 12 | 2.88 | 0.97 |
| Example 18 | 8:92 | 829 | 54 | 22.43 | 39 | 14 | 3.03 | 1.10 |
| Comparative Example 6 | 0:100 | 561 | 168 | 26.27 | 57 | 24 | 1.82 | 1.03 |

Figure 1:
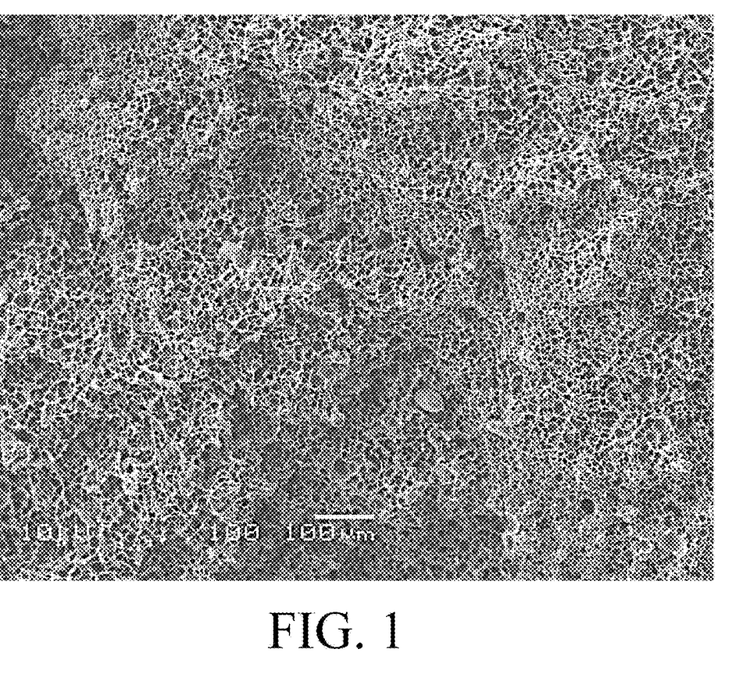
FIGS. 1-11 are scanning electron microscope (SEM) photographs of Foams (1)-(11) according to embodiments of the disclosure.
Figure 2:
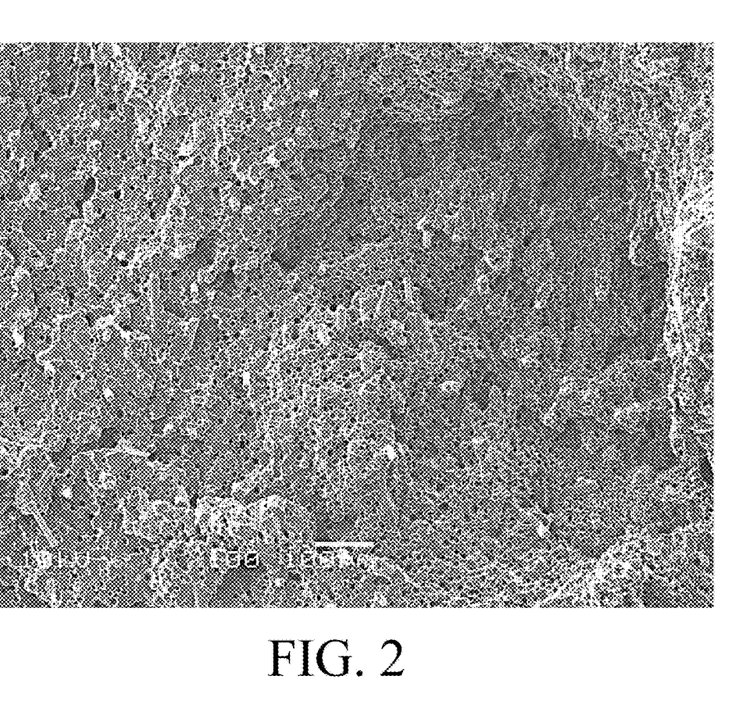
Figure 3:
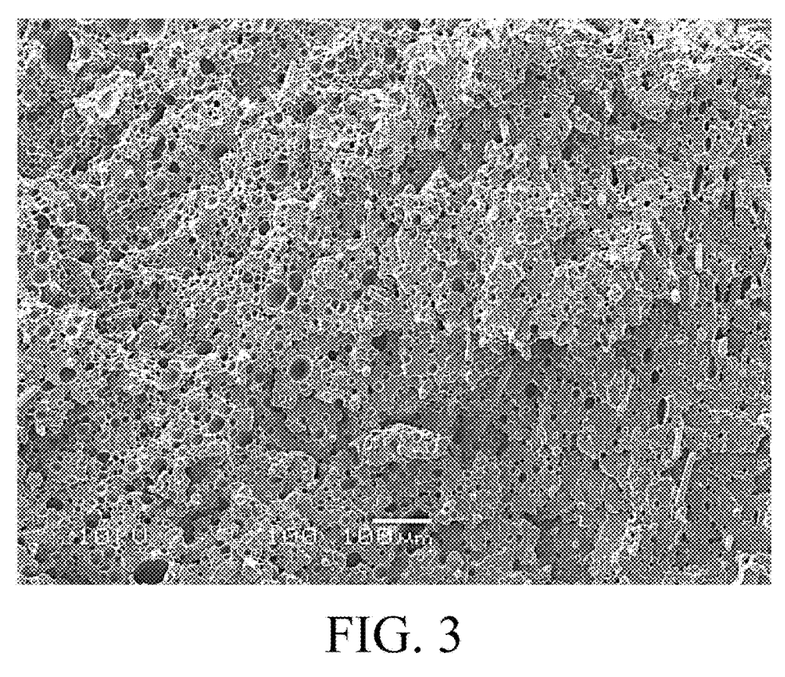
Figure 4:
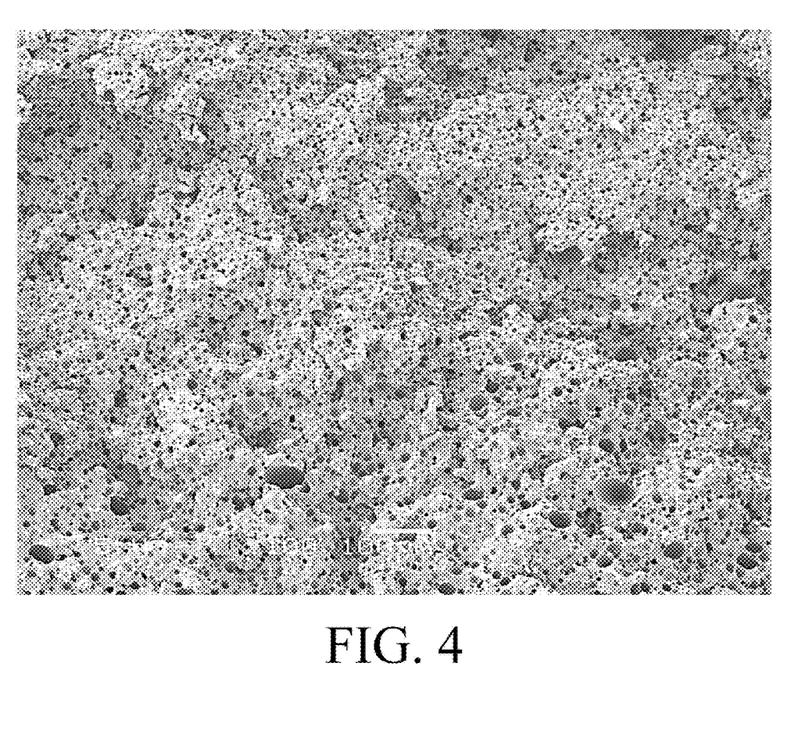
Figure 5:
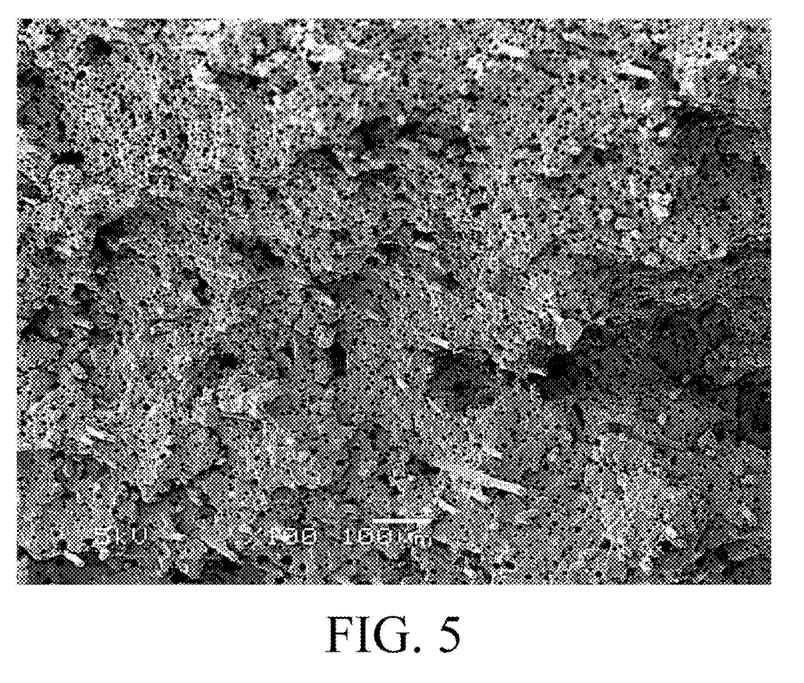
Figure 6:
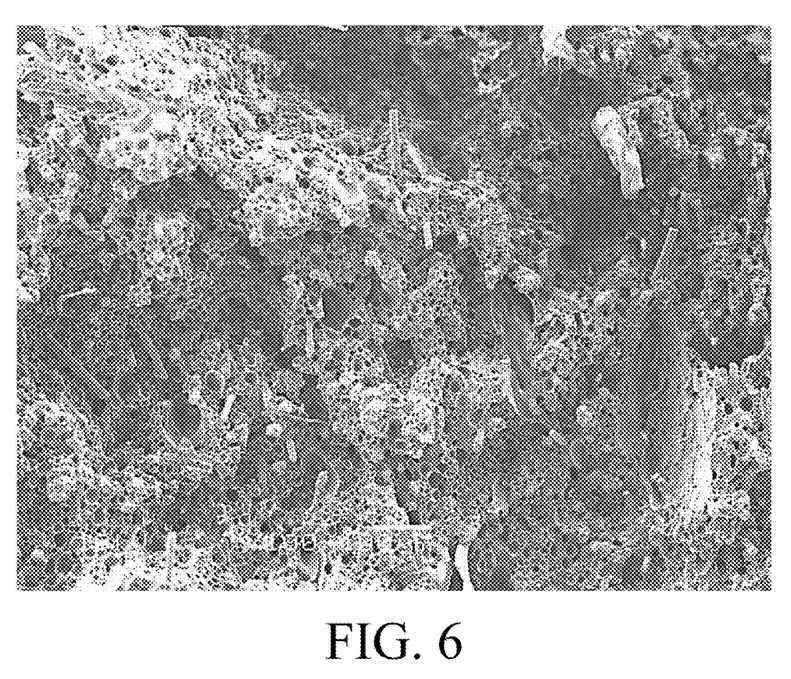
Figure 7:
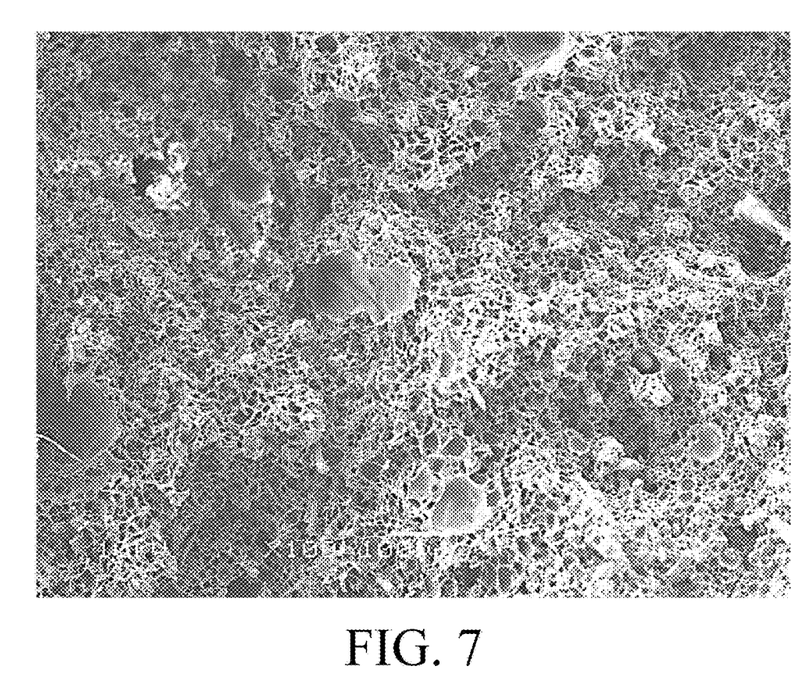

Since Composite material masterbatch (7) of Comparative Example 6 exhibits relatively low melt strength, surface bubbles and inner bubbles (i.e. foam cell with a size greater than 100 μm) in Form (7) prepared from Composite material masterbatch (7) could be observed obviously (as shown in FIG. 7), thereby deteriorating the characteristics (such as low tensile strength) of Foam (7) (as shown in Table 4). In addition, as shown in FIGS. 1-6, Foam (1)-(6) prepared from Examples 14-19 exhibits relatively low defects (surface bubbles or inner bubbles) and has a relatively uniform foam cell size. When the ratio of the oligomer to polyamide is 10:90, Foam (6) exhibits increased foam cell size and decreased foam cell density.

Examples 20-22 and Comparative Example 7

Composite material masterbatches (8)-(11) of Examples 7-9 and Comparative Example 2 were dried at 100° C. for 12 hours. Next, the dried Composite material masterbatch (8)-(11) were subjected to a microcellular foaming process individually, obtaining Foam (8)-(11). The foaming process was performed by a supercritical fluid within a microcellular foam injection molding machine (J450EL-MuCell, commercially available from Japan Steel Works LTD.) in the condition that the process temperature was 300° C., the gas pressure was 2000 psi, and the volume ratio of nitrogen gas to carbon dioxide was 7:3.

Next, the tensile strength and the impact strength of Foam (8)-(11) were measured. Furthermore, the foam cell size, foam cell density, and foam density of Foam (8)-(11) were determined by a non-destructive stereo-tomography (X-Ray Computerize Tomography (X-Ray CT)), and the results are shown in Table 5. FIGS. 8-11 are scanning electron microscope (SEM) photographs of Foams (8)-(11) respectively.

TABLE 5

| | polytetra-fluoroethylene (PTFE)(wt %) | tensile strength (kgf/cm$^2$) | impact strength (J/m) | foam cell size (Davg) (μm) | D90 (μm) | D10 (μm) | foam cell density (10$^5$/cm$^3$) |
|---|---|---|---|---|---|---|---|
| Comparative Example 7 | 0 | 985 | 168 | 33.59 | 47 | 12 | 8.53 |
| Example 20 | 0.5 | 1035 | 143 | 32.70 | 43 | 10 | 9.92 |
| Example 21 | 1 | 995 | 135 | 28.69 | 38 | 9 | 15.6 |
| Example 22 | 1.5 | 1010 | 138 | 25.81 | 36 | 11 | 21.3 |
| Example 15 | 2 | 846 | 141 | 22.42 | 34 | 11 | 29.6 |

Figure 8:
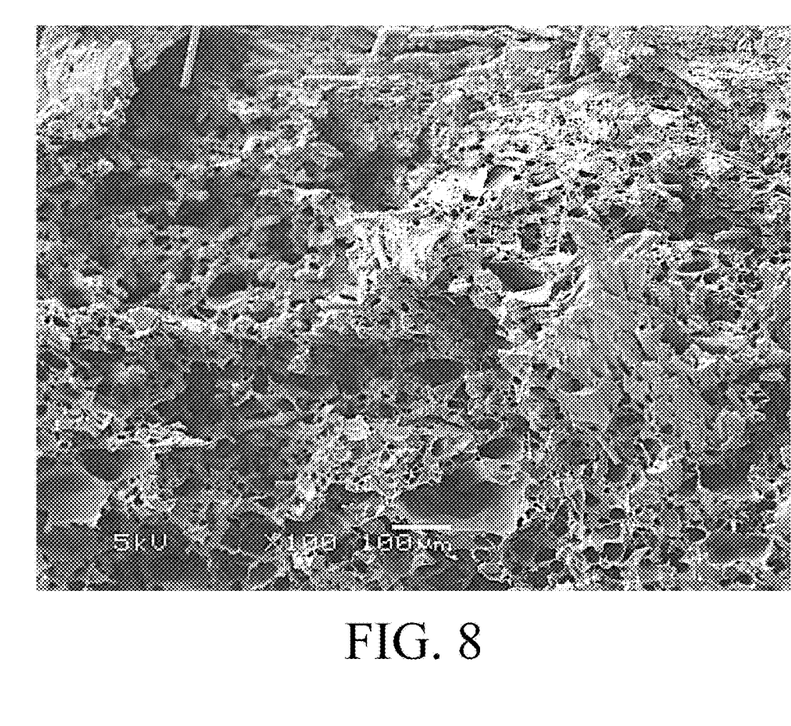
Figure 9:
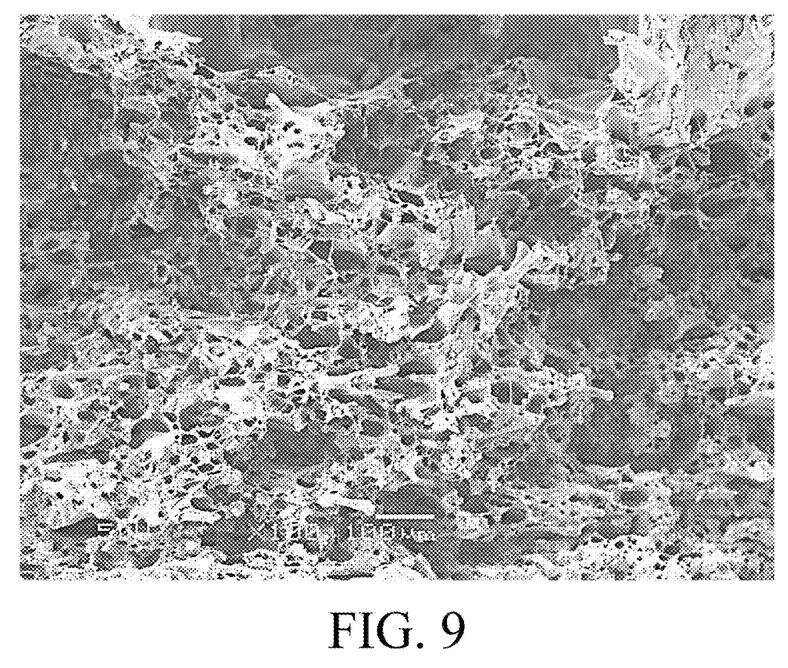
Figure 10:
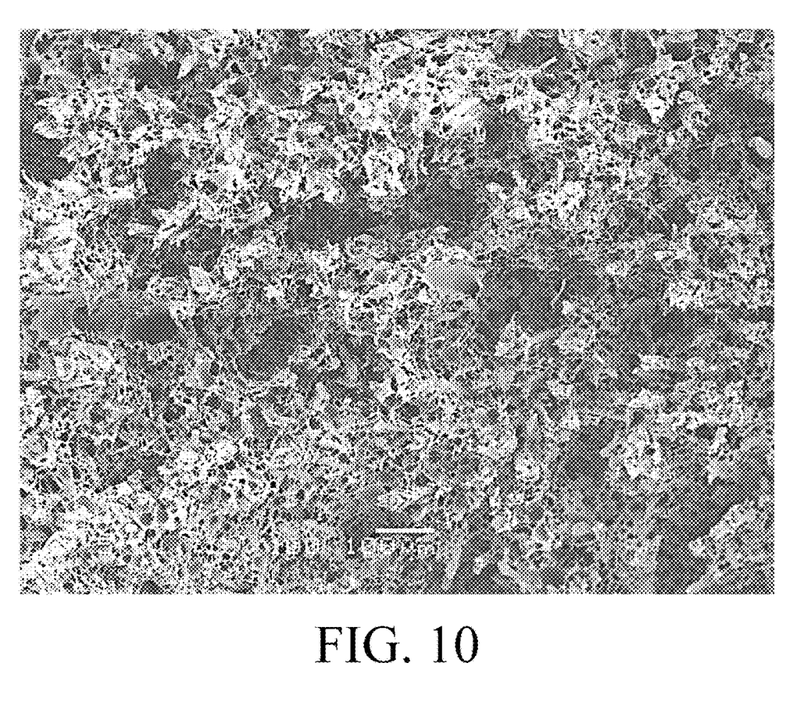
Figure 11:
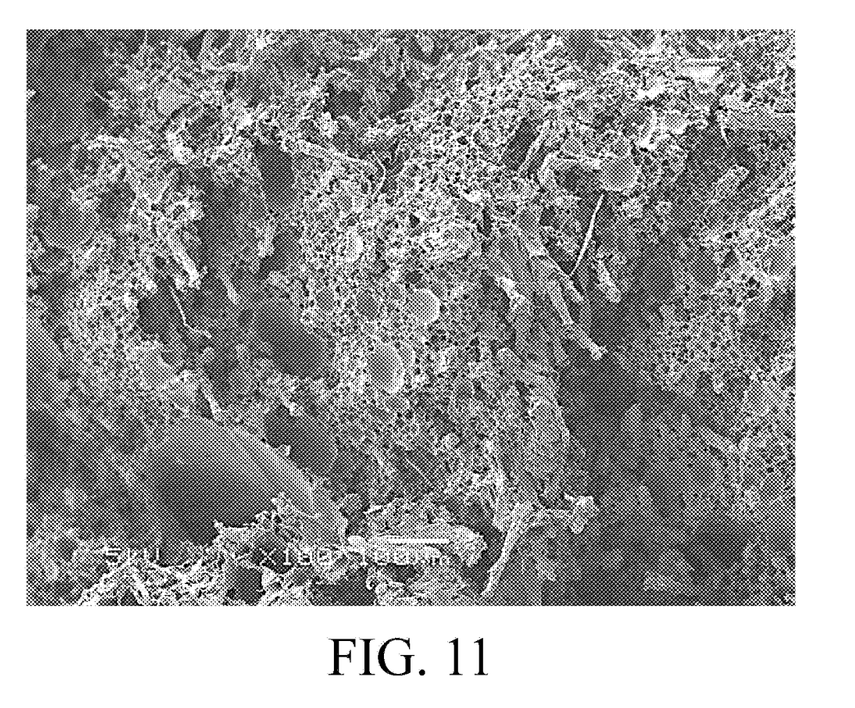

Since Composite material masterbatch (11) of Comparative Example 7 did not include polytetrafluoroethylene (PTFE), surface bubbles and inner bubbles in Foam (11) prepared from Composite material masterbatch (11) could be observed obviously (as shown in FIG. 11). Furthermore, due to the broad foam cell size distribution (i.e. large size difference among foam cells), Foam (11) exhibits inferior characteristics (for example, the tensile strength difference of the material before and after the foaming is large). In addition, as shown in FIGS. 8-10, Foam (8)-(10) prepared from Examples 20-22 exhibits relatively low defects (surface bubbles or inner bubbles) and has a relatively uniform foam cell size. Furthermore, the foam cell size is decreased with increasing amount of polytetrafluoroethylene (PTFE), as shown in Table 5.

Examples 23-26

Composite material masterbatches (14)-(17) of Examples 10-13 were dried at 100° C. for 12 hours. Next, the dried Composite material masterbatch (14)-(17) were subjected to a microcellular foaming process individually, obtaining Foam (12)-(15). The foaming process was performed by a supercritical fluid within a microcellular foam injection molding machine (J450EL-MuCell, commercially available from Japan Steel Works LTD.) in the condition that the process temperature was 300° C., the gas pressure was 2000 psi, and the volume ratio of nitrogen gas to carbon dioxide was 7:3.

Next, the tensile strength and the impact strength of Foam (12)-(15) were measured and the results are shown in Table 6.

TABLE 6

| | polymer | tensile strength (kgf/cm$^2$) | impact strength (J/m) |
|---|---|---|---|
| Example 23 | polyamide (1) | 1484 | 138 |
| Example 24 | polyamide (2) | 1272 | 66 |
| Example 25 | polyethylene terephthalate (PET) | 438 | 41 |
| Example 26 | thermoplastic polyester elastomer | 170 | 156 |

As shown in Table 3 and Table 6, various polyamide or polyester can be used for preparing the composite material of the disclosure, and the obtained composite material can be used to fabricate a foam.

It will be clear that various modifications and variations can be made to the disclosed methods and materials. It is intended that the specification and examples be considered as exemplary only, with the true scope of the disclosure being indicated by the following claims and their equivalents.

What is claimed is:

1. A composite material, comprising a network polymer, a fluorine-containing polymer fiber, and a reinforcement fiber, wherein the network polymer is a crosslinking reaction product of a polymer and an oligomer, wherein the polymer is polyamide, polyester, polyurethane, or a combination thereof; and the oligomer is a vinyl aromatic-co-acrylate oligomer with an epoxy functional group, wherein the oligomer has a weight percentage of 1 wt % to 10 wt %, based on the weight of the network polymer; and the ratio of the weight of the reinforcement fiber to the total weight of the network polymer and the fluorine-containing polymer fiber is from 1:9 to 4:6.

2. The composite material as claimed in claim 1, wherein the network polymer and the fluorine-containing polymer fiber form a semi-interpenetrating polymer network.

3. The composite material as claimed in claim 1, wherein the fluorine-containing polymer fiber has a weight percentage of 0.1 wt % to 2 wt %, based on the total weight of the network polymer, the fluorine-containing polymer fiber, and the reinforcement fiber.

4. The composite material as claimed in claim 1, wherein the composite material has a melt flow index of 0.7 to 20.

5. The composite material as claimed in claim 1, wherein the polyamide is polycaprolactam, polyhexamethylene adipamide, polylaurolactam, polydodecanoamide, polybutyrolactam, polyhexamethylene dodecanoamide, polyundecanoamide, polyhexamethylene sebacamide, polydecamethylene sebacamide, or a combination thereof.

6. The composite material as claimed in claim 1, wherein the polyester is polyethylene terephthalate (PET), polybutylene terephthalate (PBT), polyethylene terephthalate glycol (PETG), polycyclohexylenedimethylene terephthalate glycol (PCTG), polybutylene terephthalate (PBT), polycyclohexylenedimethylene terephthalate (PCT), polyethylene naphthalate (PEN), polytrimethylene terephthalate (PTT), or a combination thereof.

7. The composite material as claimed in claim 1, wherein the vinyl aromatic-co-acrylate oligomer with an epoxy functional group is a copolymer of a vinyl aromatic monomer and an acrylate-based monomer, wherein the acrylate-based monomer comprises an acrylate monomer with an epoxy functional group.

8. The composite material as claimed in claim 7, wherein the vinyl aromatic monomer is styrene, methylstyrene, ethylstyrene, propylstyrene, cyclohexyl styrene, vinyl biphenyl, or a combination thereof.

9. The composite material as claimed in claim 7, wherein the acrylate monomer with an epoxy functional group is glycidyl acrylate, glycidyl methacrylate, 3,4-epoxybutyl methacrylate, 3,4-epoxybutyl acrylate, or a combination thereof.

10. The composite material as claimed in claim 7, wherein the acrylate-based monomer further comprises methyl acrylate, methyl methacrylate, ethyl acrylate, ethyl methacrylate, n-butyl acrylate, n-butyl methacrylate, sec-butyl acrylate, sec-butyl methacrylate, tert-butyl acrylate, tert-butyl methacrylate, cyclohexyl acrylate, cyclohexyl methacrylate, or a combination thereof.

11. The composite material as claimed in claim 1, wherein the vinyl aromatic-co-acrylate oligomer with an epoxy functional group has repeating units of repeating unit arranged in a block, an alternating fashion, or a random fashion, wherein $R^1$, $R^2$, $R^4$, $R^6$, or $R^7$ are independently hydrogen or $C_{1-6}$ alkyl group; $R^3$ is hydrogen, $C_{1-6}$ alkyl group, $C_{5-7}$ cycloalkyl group, or phenyl group; and $R^5$ is $C_{1-6}$ alkyl group, or $C_{5-7}$ cycloalkyl group.

12. The composite material as claimed in claim 11, wherein the vinyl aromatic-co-acrylate oligomer with an epoxy functional group has x number of y number of and z number of wherein x, y and z are independently an integer from 1 to 30.

13. The composite material as claimed in claim 12, wherein z: (x+y) is from 2:1 to 20:1.

14. The composite material as claimed in claim 1, wherein the fluorine-containing polymer fiber is polytetrafluoroethylene (PTFE) fiber, polyvinylidene fluoride (PVDF) fiber, perfluoroalkoxy alkane (PFA) fiber, fluorinated ethylene propylene (FEP) fiber, or a combination thereof.

15. The composite material as claimed in claim 1, wherein the fluorine-containing polymer fiber has an aspect ratio of 5 to 2000.

16. A foam, comprising the composite material as claimed in claim 1 and a plurality of foam cells, and the foam cells are disposed in the composite material.

17. The foam as claimed in claim 16, wherein the foam cells of the foam have an average pore diameter of 10 to 50 μm.

18. The foam as claimed in claim 16, wherein the difference between the pore diameter distribution D90 and the pore diameter distribution D10 of the foam cells is from 20 μm to 35 μm.

* * * * *